United States Patent [19]

Seaford

[11] Patent Number: 4,535,827

[45] Date of Patent: Aug. 20, 1985

[54] MOLDED SHOCK-ABSORBING WHEEL ASSEMBLY

[75] Inventor: F. Leo Seaford, Concord, N.C.

[73] Assignee: Wil-Mat Corporation, Gastonia, N.C.

[21] Appl. No.: 587,302

[22] Filed: Mar. 7, 1984

[51] Int. Cl.³ ............... B60B 5/02; B60B 9/12; B60C 7/08
[52] U.S. Cl. ........................... 152/7; 152/48; 152/323; 301/63 PW; 264/263; 264/273
[58] Field of Search ............ 156/125; 301/63 PW; 152/42, 47, 48, 49, 50, 40, 310, 311, 323, 324, 326, 327, 357 A, 7; 29/159 R, 159.01; 264/263, 273

[56] References Cited

U.S. PATENT DOCUMENTS

| | | | |
|---|---|---|---|
| 2,791,256 | 5/1957 | Sinclair | 152/323 X |
| 2,836,982 | 6/1958 | Voss et al. | 152/323 X |
| 3,666,322 | 5/1972 | Pickron | 301/63 PW |
| 3,843,202 | 10/1974 | Lacerte | 301/63 PW |
| 4,164,251 | 8/1979 | Chung | 301/63 PW X |

FOREIGN PATENT DOCUMENTS

| | | | |
|---|---|---|---|
| 33734 | 12/1964 | German Democratic Rep. | 152/323 |
| 456373 | 7/1968 | Switzerland | 152/323 |

Primary Examiner—David A. Scherbel
Attorney, Agent, or Firm—Richards, Shefte & Pinckney

[57] ABSTRACT

A shock-absorbing wheel assembly having an annular cast iron core member disposed concentrically about an annular bearing seat in spaced relation thereto, with the core member having passageways extending radially therethrough. A continuous integral mass of moldably polyurethane is provided to cover the exterior surface of the core member with a predetermined thickness, to fill the passageways in the core member, and to fill the spacing between the core member and the bearing seat. A method of forming the wheel assembly is provided, which includes locating the core member and bearing seat within a cylindrical mold cavity, permitting flowable polyurethane to flow into the interconnected spacings and passageways, and allowing the polyurethane to cure.

4 Claims, 3 Drawing Figures

MOLDED SHOCK-ABSORBING WHEEL ASSEMBLY

BACKGROUND OF THE INVENTION

In many industrial and commercial operations, large wheeled carts and the like are used to transport parts, components and similar items from one location to another. For example, in the automotive industry, it is common practice to use such wheeled carts to transport parts from place to place in assembly line operations, and in many instances, these carts are quite large so as to be capable of transporting parts and components that are both large and heavy, and they must be rolled over floor surfaces and terrains that are rough and uneven. As a result, these carts and the cargo carried therein are subjected to jolts and bounces during movement across the uneven surface, which can result in undesirable consequences, including damage to the cargo and the generation of noise levels that may exceed acceptable limits such as those determined by OSHA.

In an effort to deal with these undesirable consequences, these wheeled carts are usually provided with specially formed wheels designed to absorb the shock loads imposed on the cart during its movement over uneven or rough surfaces. A typical example of such wheels is one which includes a cart iron core or annular rim member formed at the exterior or peripheral surface thereof with a one-half inch to one inch layer of molded polyurethane. However, while these molded polyurethane coverings do tend to absorb some of the shock loads imposed on the cart, they generally do not absorb enough of the shock load in some heavy-duty cart applications.

It has also been heretofore proposed that the wheel assembly be formed with a polyurethane covering at the exterior surface of the cast iron core, and with an additional and separate annular layer of polyurethane disposed between the interior annular surface of the core and the exterior annular surface of the bearing seat member of the wheel. Wheels of this type perform better in terms of absorbing shock loads, but they tend to be difficult to manufacture and somewhat unreliable because the intermediate layer of polyurethane must be poured into the annular spacing between the core and the bearing seat, and, during curing of the polyurethane, there is an inherent shrinkage of the polyurethane, which can cause the outer surface of the polyurethane to be drawn away and separated from the inner surface of the core, whereby the bearing seat and the intermediate layer of polyurethane can become separated from the core. The tendency of the polyurethane to shrink can be offset to a large extent by providing for controlled cooling of the polyurethane, during curing, over a long period of time under carefully controlled conditions, but this process substantially increases the cost of manufacture of the wheels, even to the point, in some cases, of making the process commercially prohibitive.

By contrast, the present invention comprises a shock-absorbing wheel assembly which provides at least the same capacity to absorb shock loads as that of the double-layer polyurethane which is described above, yet it can be produced at significantly reduced manufacturing costs and it has good structural integrity.

SUMMARY OF THE INVENTION

In accordance with this present invention, a shock-absorbing wheel is produced by providing a generally annular core member formed of a hardened material, preferably cast iron, and forming at least one passageway in the core member which extends radially therethrough between the annular interior surface and the annular exterior surface thereof. An annular bearing means, preferably an annular bearing seat formed of hardened metal such as steel, is provided for disposition concentrically within the core member, with the exterior surface of the bearing means being spaced from the interior annular surface of the core member. A moldable plastic material, preferably polyurethane, is then used to cover the exterior surface of the core member with a predetermined thickness to provide a tread for the wheel assembly; to fill the passageway or passageways in the core member; and to fill the aforesaid spacing between the core member and the bearing means, whereby a unitary wheel assembly is formed with the polyurethane material providing the sole bond between the core member and the bearing means, and with the polyurethane material providing a shock-absorbing function at the exterior surface of the core member and between the core member and the bearing means.

To produce the wheel assembly of the present invention, the above-described core member is placed in a cylindrical mold cavity with the exterior annular surface of the core member spaced from the periphery of the mold cavity and the above-described bearing means is located in the mold concentrically with respect to the core member. The plastic material in a flowable state is then poured into the mold cavity until it fills the spacing between the core member and the bearing means, fills the passageway or passageways in the core member, and fills the spacing between core member and the periphery of the mold. The plastic material is then cured over a relatively short period of time, whereby the unitary wheel assembly is formed.

DESCRIPTION OF THE PREFERRED EMBODIMENT

Figure 1:
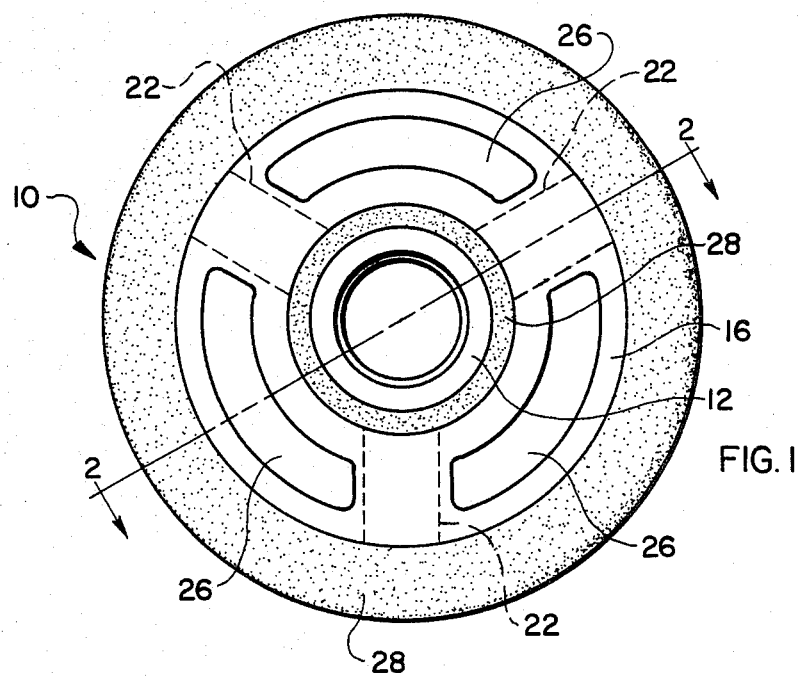
FIG. 1 is a side elevational view of a shock-absorbing wheel assembly embodying the present invention.
Figure 2:
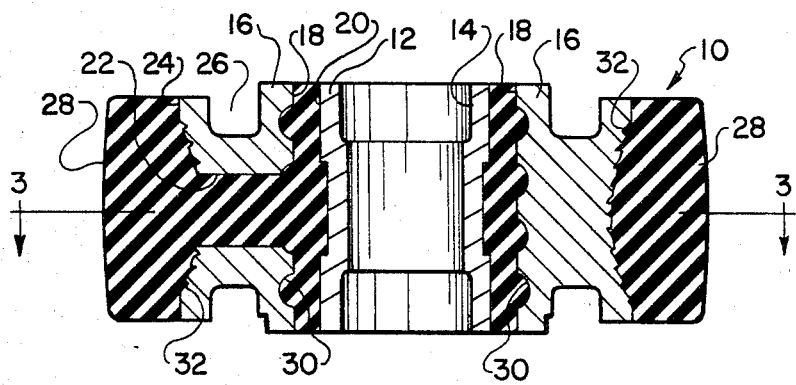
FIG. 2 is a sectional view taken along section line 1—1 in FIG. 1.
Figure 3:
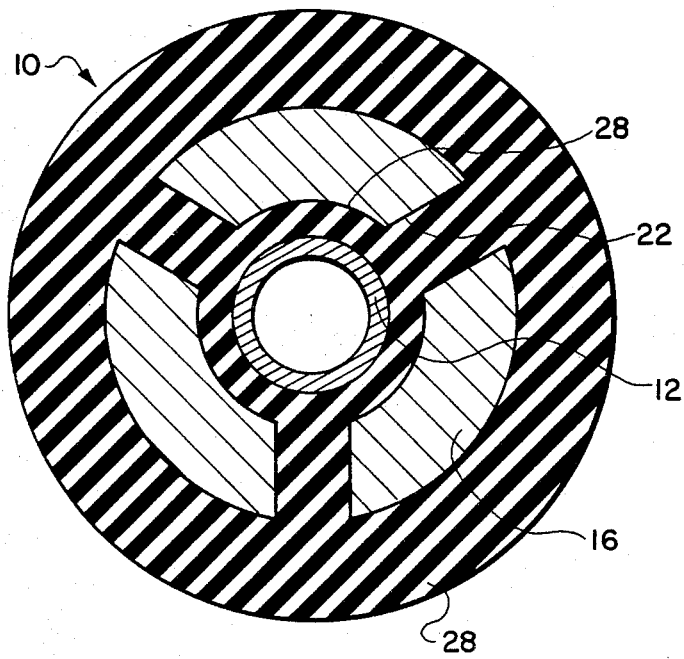
FIG. 3 is a sectional view taken along section line 3—3 in FIG. 2.

Turning now in greater detail to the accompanying drawings, FIGS. 1-3 illustrate a shock-absorbing wheel assembly 10 which includes a generally annular bearing seat 12, preferably formed of a hardened metal such as steel, that has an interior surface 14 designed to receive an appropriate bearing member and axel (not shown) when the wheel is mounted on a cart or the like (not shown). An annular core member 16, preferably made of cast iron, is disposed concentrically about the bearing seat 12, with the interior, generally annular surface 18 of the core member 16 spaced from the interior, generally annular surface 20 of the bearing seat 12. The core member 16 has at least one, and preferably three passageways 22 formed to extend radially therethrough between the aforesaid interior surface 18 to the generally annular exterior surface 24 of the core member 16, and arcuate indentations 26 may be formed in the radially extending side walls thereof. A plastic material 28, preferably polyurethane having a Shore 55-D hardness, is provided to form a continuous and integral mass of such material that covers the exterior surface 24 of the core member 16 with a predetermined thickness of the material (e.g. one inch thickness for a wheel having a maximum diameter of eight inches) to provide a tread, and the plastic material also fills the spacing between the core member 16 and the bearing seat 12 and the passageways 22. The interior surface 18 and the exterior surface 24 of the core member 16 may both be formed with grooves or similar indentations 30 and 32, respectively, to provide a better bond between the plastic material 28 and the core member 16 so as to assist in preventing any relative sliding movement therebetween after the wheel assembly 10 is formed. The mass of plastic material 28 preferably has an axial width corresponding to the axial width of the core member 16 and the bearing seat as best seen in FIG. 2.

To produce the wheel assembly 10, a conventional plastic-forming mold (not shown) is used, such mold defining a cylindrical cavity having a diameter and axial width corresponding to that of the wheel assembly 10 as illustrated in FIG. 1. The core member 16 having the passageways 22 formed therein is located in the cylindrical mold cavity concentrically therewith so that the exterior surface 24 of hte core member 16 is spaced from the periphery of the cylindrical mold cavity, and the bearing seat 12 is also located in the mold cavity concentrically therewith, and disposed concentrically within the core member 16 and spaced therefrom as shown in FIG. 1. Flowable polyurethane, usually at 212° F., is then introduced into the mold cavity so that it will flow into the spacing between core member 16 and the periphery of the mold cavity, the spacing between the core member 16 and the bearing seat 12, and into the passageways 22, it being noted that the passageways 22 permit the free flow of the polyurethane between the two aforesaid spacings.

Once the spacings and the passageways 22 are filled with polyurethane, the mold is kept in a curing oven at a temperature of approximately 212° F. for a period of about thirty minutes during which final curing occurs, after which the polyurethane is permitted to cool at ambient temperature and the wheel assembly is removed from the mold. Since the passageways 22 are completely surrounded by the cast iron core member 16, the polyurethane in these passageways 22 will generally cure at a somewhat slower rate than the polyurethane at the interior and exterior surface of the core member 16. It has been found that this slower curing rate, combined with the fact that the passageways 22 interconnects with both of the two annular masses of polyurethane at the interior and exterior surface of the core member, results in a reduction of tendency of the innermost annular mass to shrink inwardly toward the bearing seat 12, and it is believed that the slower curing polyurethane in the passageways 22 acts to some extent to draw the two annular masses of polyurethane toward one another. These factors serve to avoid any significant tendency of the inner annular mass to shrink toward the bearing seat 12 to such an extent that it will separate from the interior surface 18 of the core member 16, and the relatively short curing time required by the present is in marked contrast to the lengthy and expensive controlled cooling used to cure conventional wheel assemblies of this type, as discussed above. It is also to be noted that, once cured, the polyurethane in the passageways 22 forms radial spokes that joins the two annular masses of polyurethane to provide a structural lock to hold the core member 16 securely in place.

Thus, the wheel assembly 10 of the present invention has two separate and distinct layers of polyurethane which provide the wheel assembly 10 with a significant ability to withstand shock loads and reduce the noise generated by large, heavy wheeled carts being moved over uneven surfaces. Moreover, by virtue of providing the unique passageways 22 in the core member 22, the wheel assembly 10 has a sturdy construction that can withstand the rigors of heavy-duty applications, and it can be produced at manufacturing costs which are commercially practical.

The present invention has been described in detail above for purposes of illustration only and is not intended to be limited by this description or otherwise to exclude an variation or equivalent arrangement that would be apparent from, or reasonably suggested by the foregoing disclosure to the skill of the art.

I claim:

1. A shock-absorbing wheel assembly comprising:
   (a) annular bearing means;
   (b) an annular core member disposed concentrically about said bearing means with the interior surface of said core member spaced from the exterior surface of said bearing means, said annular core member having at least one passageway extending radially therethrough from the exterior surface thereof to said interior surface thereof; and
   (c) a moldable plastic material disposed to cover said exterior surface of said core member with a predetermined thickness, to fill said radial passageway, and to fill said spacing between said core member and said bearing means, whereby said moldable plastic material constitutes the sole bond between said bearing member and said core, and forms a tread portion at the exterior surface of said core member.

2. A shock-absorbing wheel assembly as defined in claim 1 and further characterized in that said core member is formed of cast iron, and in that said moldable plastic material is polyurethane.

3. A method of producing a shock-absorbing wheel assembly, comprising the steps of:
   (a) forming a generally annular core member with at least one passageway extending radially therethrough between the annular interior and exterior surfaces thereof;
   (b) locating said core member in a generally cylindrical mold cavity with the annular exterior surface of said core member spaced from the internal peripheral surface of said mold cavity;
   (c) locating a generally annular bearing means in said mold cavity concentrically with respect to said core member, and with the annular exterior surface of said bearing means spaced from the annular interior surface of said core member;
   (d) pouring a flowable, curable plastic material into said mold cavity until it fills said spacing between said core member and said bearing means, fills said passageway in said core member, and fills said spacing between said core member and said mold cavity; and
   (e) causing said plastic material to cure whereby it forms the sole bond between said core member and said bearing means, and forms a tread at the exterior surface of said core member.

4. A method of producing a shock-absorbing wheel assembly as defined in claim 3 and further characterized in that the step of curing said plastic material includes maintaining the temperature thereof at a temperature of approximatley 212° F. until it is fully cured, and then permitting the plastic material to cool at ambient temperature.

* * * * *